United States Patent Office 3,400,138
Patented Sept. 3, 1968

3,400,138
$\Delta^{1,3}$-5α-ANDROSTADIEN-3,17β-DIOL-3,17-DIESTERS
Rudolf Wiechert, Berlin, Germany, assignor to
Schering AG., Berlin, Germany
No Drawing. Filed June 3, 1965, Ser. No. 461,177
Claims priority, application Germany, July 1, 1964,
Sch 35,410
5 Claims. (Cl. 260—397.5)

ABSTRACT OF THE DISCLOSURE

Androstadiens of the formula

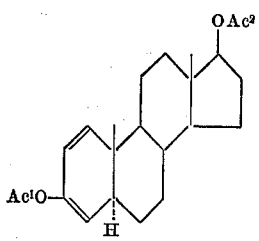

wherein $Ac^1$ and $Ac^2$ are lower carboxylic acid acyl groups are disclosed. The compounds have exceptionally strong anabolic activity at small dosages.

---

This invention relates to androstadiens of the formula

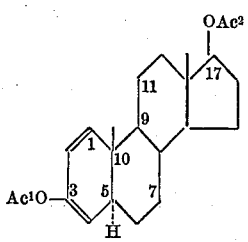

in which $Ac^1$ and $Ac^2$ are the same or different lower carboxylic acid acyl groups.

These compounds have considerable physiological activity and are valuable intermediates for the preparation of therapeutically useful steroids. They are distinguished particularly by strong anabolic activity at small dosages and with minimal androgenic side effects.

The compounds of the invention are obtainable by treatment of a 1-acyloxy-3-keto-5α-steroid at elevated temperature with an enol-acylating reagent. The reaction may be represented as follows:

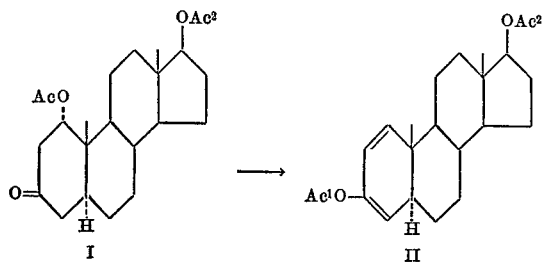

The result of this reaction is most surprising. It was to be expected by chemists' knowledge in this art that the axial acyloxy group in the 1-position would rapidly split off and react with an adjacent hydrogen atom under the reaction conditions and that the resulting $\Delta^1$-3-keto-steroid would react no further. In view of the resultants obtained in accordance with the method of the invention, it must be assumed, however, that a 3-enol acylation takes place first and that only then the $\Delta^1$-double bond is formed.

The desired reaction takes place under the usual conditions of enol-acylation, preferably by heating suitable 1-acyloxy-3-ketosteroids with enol-acylation reagents, such as iopropenyl acetate and p-toluene sulfonic acid, carboxylic acid anhydride and p-toluene sulfonic acid, isopropenyl acetate and sulfuric acid, or carboxylic acid anhydride and alkali metal salt of the corresponding carboxylic acid.

Starting compounds of Formula I are obtainable by known means from the corresponding 1-hydroxy compounds, which in turn are obtainable by the methods described in German Patents Nos. 1,152,103 and 1,154,467.

To illustrate the utility of the compounds of the invention, it is noted that $\Delta^{1,3}$-5α-androstadien-3,17β-diol-3,17-diacetate, for example, shows highly effective anabolic activity even at low dosages while having minimal androgenic side-effects. This compound was tested and compared with other compounds in *Levator ani* and *Vesicula seminalis* tests on castrated male rats by daily subcutaneous injections of 0.1 mg. per animal for twelve days. The results were as follows:

TABLE

| Compound | Weight of organ in mg. per 100 g. of animal | |
|---|---|---|
| | Vesicula Seminalis | Levator ani |
| (1) Testosterone-propionate | 180 | 28 |
| (2) 4-chloro-testosterone-acetate | 15 | 9 |
| (3) $\Delta^{1,3}$-5α-androstadien-3,17β-diol-3,17-diacetate | 110 | 49 |
| (4) None (control) | 17 | 12 |

These data show that the compound of Test No. 3 exhibits strong anabolic efficacy. The compound of Test No. 2, known for its anabolic activity, exhibits no such activity at the same small dosage. It is also indicated that, at said small dosage, the compound of Test No. 1 has little anabolic and strong androgenic effect.

EXAMPLE 1

(A) 50 g. 5α-androstan-1α,17β-diol-3-one-17-acetate, 250 ml. anhydrous pyridine and 125 ml. acetic anhydride are stirred for three days at room temperature. The reaction mixture is stirred into ice water, the precipitate is filtered off by suction, washed neutral with water, dried and recrystallized from ethyl acetate. 32 g. 5α-androstan-1α,17β-diol-3-one-1,17-diacetate, having a melting point (with decomposition) of 172–174° C. are obtained.

(B) 10 g. of the diacetate thus obtained, 200 ml. distilled isopropenyl acetate and 5 g. p-toluene sulfonic acid are heated under reflux for 22 hours. After cooling, the reaction mixture is diluted with ethyl ether, the organic phase is washed neutral with water and dried with sodium sulfate. After concentration under a vacuum, chromatographic filtration with silica gel and recrystallization from methanol upon addition of a little pyridine, 6.7 g. $\Delta^{1,3}$ - 5α - androstadien-3,17β-diol-3,17-diacetate, having a melting point of 140–141° C. and a $U.V._{\epsilon\ 207}$ of 4200, are obtained.

EXAMPLE 2

3 g. 5α-androstan-1α,17β-diol-3-one-1,17-diacetate prepared as described in Example 1, Part A, 100 ml. acetic anhydride and 1.5 g. p-toluene sulfonic acid are heated five hours on a steam bath. After cooling, the reaction mixture is stirred into ice water with some pyridine, the precipitate is filtered off, dissolved in ethyl ether, washed neutral with water, dried with sodium sulfate, concentrated under a vacuum, subjected to chromatographic filtration with silica gel and recrystallized from methanol with addition of a little pyridine. 1.4 g. $\Delta^{1,3}$-5α-androstadien-3,17β-diol-3,17-diacetate having a melting point at 139–140.5° C. and a $U.V._{\epsilon\ 207}$ of 4100 are obtained.

EXAMPLE 3

1 g. 5α-androstan-1α,17β-diol-3-one-1,17-diacetate prepared as described in Example 1, Part A, 50 mg. distilled isopropenyl acetate and three drops conc. sulfuric acid are heated under reflux for four hours. The reaction mixture is then diluted with ethyl ether, washed to neutral with water, dried with sodium sulfate, concentrated under vacuum, chromatographed with silica gel and recrystallized from methanol with addition of a little pyridine. 295 mg. $\Delta^{1,3}$-5α-androstadien-3,17β-diol-3,17-diacetate having a melting point at 139–140° C. and a U.V.$_{\epsilon\,207}$ of 4050 are obtained.

EXAMPLE 4

3 g. 5α-androstan-1α,17β-diol-3-one-1,17-diacetate prepared as described in Example 1, Part A, 3.175 g. sodium butyrate and 45 ml. butyric acid anhydride are heated in a stream of nitrogen under reflux for three hours while stirring. After cooling, the reaction mixture is stirred into ice water with a little pyridine, the precipitate is filtered off, dissolved in ethyl ether and washed successively with dilute hydrochloric acid, sodium bicarbonate solution and water. After drying with sodium sulfate and concentration under vacuum, the remaining residue is chromatographed with silica gel. The various fractions are combined. 730 mg. $\Delta^{1,3}$-5α-androstadiene-3,17β-diol-3-butyrate-17-acetate having a U.V.$_{\epsilon\,207}$ of 4150 are obtained.

EXAMPLE 5

(A) 1 g. 5α - androstan-1α,17β-diol-3-one-17-propionate, 5 ml. anhydrous pyridine and 2.5 ml. acetic anhydride are reacted as described in Example 1, Part A. After recrystallization from isopropylether, 550 mg. 5α-androstan-1α,17β-diol-3-one-1-acetate-17-propionate, having a melting point (with decomposition) of 159–161° C., are obtained.

(B) 500 mg. of the propionate thus obtained, 15 ml. distilled isopropenyl acetate and 250 mg. p-toluene sulfonic acid are reacted as described in Example 1, Part B. By recrystallization from methanol with addition of a little pyridine, 230 mg. $\Delta^{1,3}$-5α-androstadien-3,17β-diol-3-acetate-17-propionate having a U.V.$_{\epsilon\,207}$ of 4000 are obtained.

I claim:
1. Androstadiens of the formula

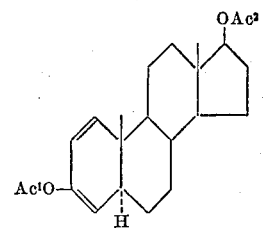

wherein $Ac^1$ and $Ac^2$ are lower carboxylic acid acyl groups.

2. $\Delta^{1,3}$-5α-androstadien-3,17β-diol-3,17-diacetate.

3. $\Delta^{1,3}$-5α-androstadien-3,17β-diol - 3 - butyrate - 17-acetate.

4. $\Delta^{1,3}$-5α-androstadien-3,17β - diol - 3 - acetate - 17-propionate.

5. The method of making androstadiens of the formula

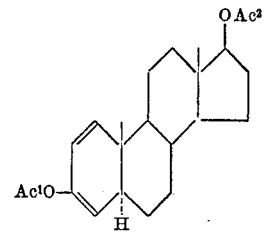

wherein $Ac^1$ and $Ac^2$ are lower carboxylic acid acyl groups, which comprises reacting the corresponding 1α-acyloxy-3-keto-5α-steroid with an enol-acylating agent at elevated temperature to form said androstadiens.

References Cited

UNITED STATES PATENTS 2,280,828   4/1962   Inhoffen _____ 260—397.2

LEWIS GOTTS, *Primary Examiner.*

E. G. LOVE, *Assistant Examiner.*